(No Model.)
G. E. STRAUSS.
BALL BEARING.
No. 576,500.   Patented Feb. 2, 1897.
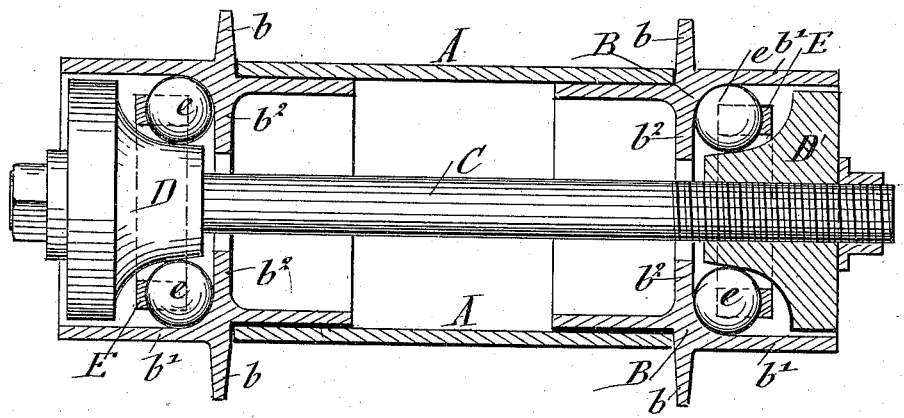
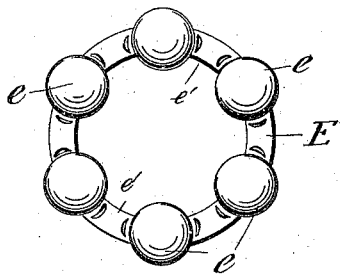
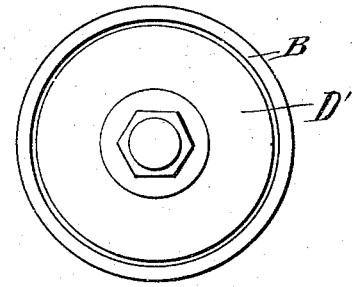
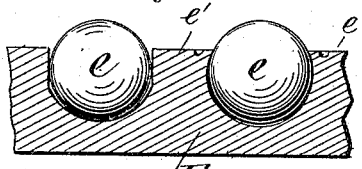
WITNESSES:
Jos. Rothschild
a. Treulich
INVENTOR
Gustavus E. Strauss
BY
Charles Kay
ATTORNEY.

UNITED STATES PATENT OFFICE.

GUSTAVUS E. STRAUSS, OF NEW YORK, N. Y.

BALL-BEARING.

SPECIFICATION forming part of Letters Patent No. 576,500, dated February 2, 1897.

Application filed October 7, 1896. Serial No. 608,170. (No model.)

*To all whom it may concern:*

Be it known that I, GUSTAVUS E. STRAUSS, a citizen of the United States, and a resident of New York, in the county of New York and State of New York, have invented certain new and useful Improvements in Ball-Bearings, of which the following is a specification.

My invention has reference to improvements in ball-bearings, and has the object to provide ball-bearings with ball-retaining rings of a special construction by means of which the balls can be easily and quickly attached to the axle and removed from the same. This construction is shown in the accompanying drawings, in which—

Figure 1 is a longitudinal section of a hub provided with the ball-retaining rings; Fig. 2, an end view of the hub; Fig. 3, a top view of the ball-retaining ring, and Fig. 4 a partial cross-section of the latter.

Similar letters of reference indicate corresponding parts.

A in the drawings represents a hub having on each end upwardly-extending flanges $b$ to bear the spokes of the wheel and lateral extensions $b'$, which latter form, with inwardly-extending flanges $b^2$, the curved or conical inner walls of the ball-chambers, as usual in ball-bearings.

C is the axle, having on one end a fixed cone D and on the other end another cone D', screwed upon the axle, which for this purpose is screw-threaded. If desired, both ends of the axle may be screw-threaded and both cones screwed upon the axle.

E E are devices holding the balls $e$ for the ball-bearings of the hub. Each device consists of a flat ring provided with projections $e'$, extending from one uninclosed side only, by which projections the seats of the balls $e$ are formed. After the balls are placed into the spaces created by the said projections a stroke with a suitable instrument is exerted upon each top portion of the projections near the balls, whereby the said top portions are bent sidewise toward the balls, as illustrated in Fig. 4, so that the balls are held in position between the projections and can freely rotate on their seats, but are prevented from dropping out of the same. The balls thus held between the projections of the ball-retaining ring project from their seats in three directions, namely, beyond the inner and outer sides of the projections $e'$, as well as the top portions of the same, as shown in Fig. 1.

In putting the bearing together one ball-retaining ring with its balls is placed upon one ball-chamber wall $b^2$, so that the balls come in contact with the same, and the axle C, then pushed through the hub and the cone D, touches the balls where they project beyond the inner side of the ring, whereafter the second ring is placed upon the other ball-chamber wall $b^2$ in the same manner, and finally the second cone D' is screwed upon the axle until the same comes in contact with the balls on the second ring. The balls have then the required contact with the walls of the ball-chambers.

My device has the advantage that all balls can be quickly and easily placed simultaneously into the ball-chambers and removed therefrom.

Having thus described my invention, I claim as new and desire to secure by Letters Patent—

1. In a ball-bearing, a retaining-ring having projections extending from one uninclosed side only, said projections having seats formed therein for the balls, and balls projecting from said seats in three directions, said ring being adapted to hold the balls in their seats when the ring is removed from the bearing, substantially as set forth.

2. The combination of a hub having on each end an inwardly-extending flange, the outer side surfaces of which are curved or conical, with an axle having on each end a cone forming chambers with the said flanges, in each chamber a retaining-ring having projections extending from one uninclosed side only, said projections having seats formed therein for the balls, and balls projecting from their seats in three directions, substantially as set forth.

Signed at New York, in the county of New York and State of New York, this 3d day of October, A. D. 1896.

GUSTAVUS E. STRAUSS.

Witnesses:
CHAS. KARP,
HARRY M. WILLNER.